June 4, 1929.  A. L. DMITRIEFF  1,715,905

PONTOON FOR AUTOMOBILES

Filed Nov. 19, 1927

ALEXANDER L. DMITRIEFF
INVENTOR

BY John P. Ninonow
ATTORNEY

Patented June 4, 1929.

1,715,905

UNITED STATES PATENT OFFICE

ALEXANDER L. DMITRIEFF, OF BROOKLYN, NEW YORK.

PONTOON FOR AUTOMOBILES.

Application filed November 19, 1927. Serial No. 234,383.

My invention relates to pontoons for automobiles and has a particular reference to pontoons adapted to support automobiles or similar vehicles on water and provided with propelling means, operated by the automobile engine.

The object of my invention is to provide a pontoon of a sufficient size to accommodate an ordinary automobile and also to provide a mechanism whereby this automobile can furnish a motive power for the propelling means on said pontoon.

For this purpose I provide my pontoon with an ordinary screw propeller or similar propelling means, and I connect this propeller through a suitable transmission or gearing with rolls or cylinders adapted to support driving wheels of the automobile. By operating the engine of this automobile and with front wheels locked in a fixed position on the pontoon, the propeller will rotate thereby propelling the pontoon.

My invention is more fully described in the accompanying specification and drawing in which—

Figure 1:
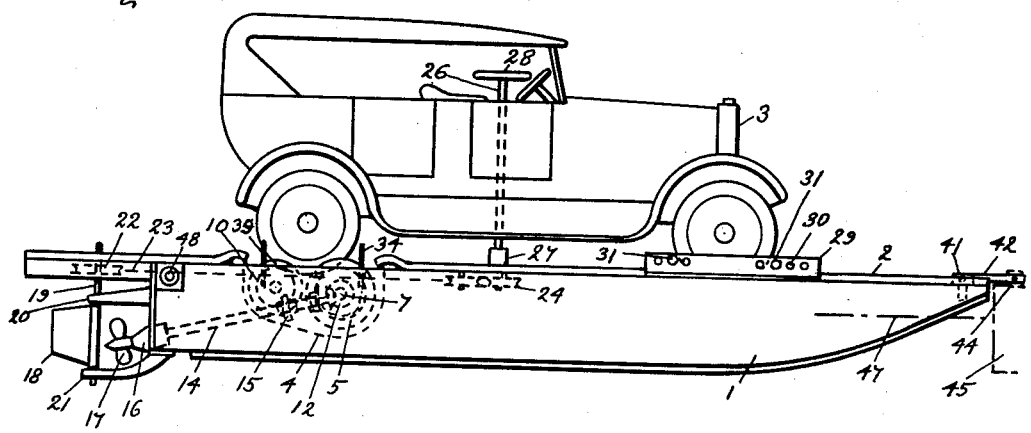
Figure 2:
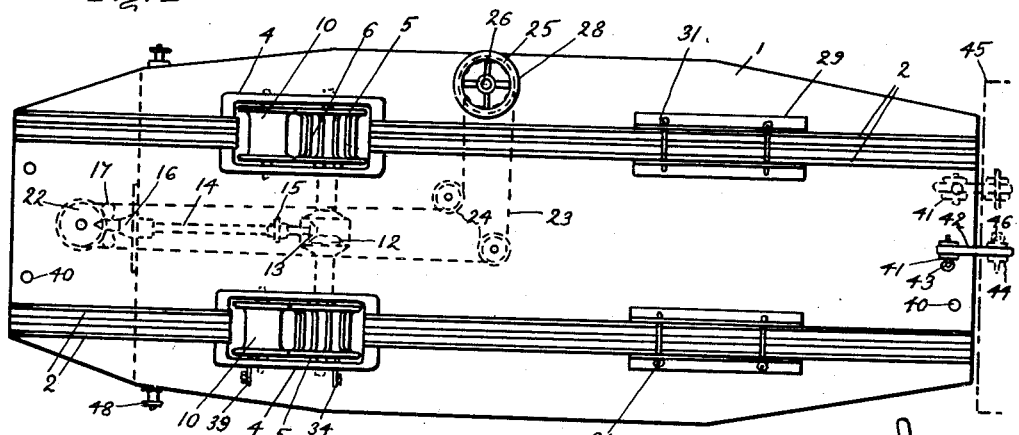
Figure 3:
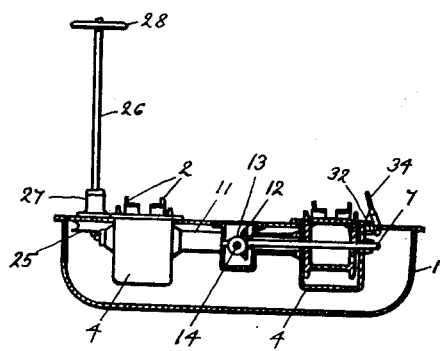
Figure 4:
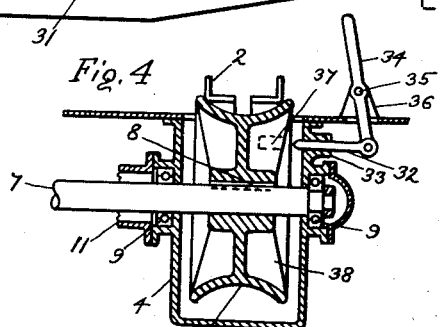

Fig. 1 is an elevation of my pontoon showing also an automobile in an operating position, Fig. 2 is a plan view of same, Fig. 3 is a cross section of the pontoon with transmission partly in section, and Fig. 4 is a partial sectional view of a roller with locking device.

My pontoon consists of a hollow hull 1 preferably made of metal and enclosed all around so as to render it water tight and unsinkable. The deck of the pontoon is made of a sufficient width to accommodate two sets of rails 2 for the wheels of an automobile 3. These rails may be made of an angle iron placed so as to form channels adapted to prevent the automobile from moving sideways on the deck of the pontoon.

At the rear of the pontoon two apertures are cut in the deck for roller housings 4 which are open on top. The ends of the rails 2 are somewhat raised at the edges of the apertures and rounded off to facilitate the rolling of the wheels over these raised portions.

Rollers 5 are provided with flanges in order to retain the wheels of an automobile and, also, with ribs 6 so as to increase the friction or adhesion between the wheel tires and the surface of the rollers. These rollers are mounted on a shaft 7 and fastened with keys 8. The shaft 7 is rotatively mounted in bearings 9 in the walls of the housings 4.

Idler rollers 10 are rotatively mounted in the housings 4 at the sides of the driving rollers 5 in order to provide support for the automobile wheels and to keep them in engagement with the driving rollers 5.

The shaft 7 is supported in a housing 11 and has a bevel gear 12 in mesh with a pinion 13 on a driving shaft 14. This shaft is provided with a flexible coupling 15 in order to take care of any irregularities of the alignment of its operating ends. The rear end of the shaft 14 is journaled in a bearing 16 and extends outside of the hull 1. A screw propeller 17 is mounted on the extension of this shaft.

The housings for the roller shaft 7 with its bearings and gears are made oil and water tight so as to maintain a good lubrication under operating conditions.

A rudder 18 is mounted on a shaft 19 rotatively supported in brackets 20 and 21 attached to the rear end of the hull 1. A pulley 22 is mounted on the shaft 19 inside of the rear end extension of the hull. This pulley or sheave is made for an operating steel cable 23 which passes under the deck around idler pulleys 24 and around a sheave 25 mounted on a vertical steering post 26. This post is rotatively supported in bearings 27 and has a steering wheel 28 on top. It is placed at such a height and in such position that the driver of the automobile can operate it from his seat when this automobile is placed in an operating position between the rails 2 and with rear wheels on the rollers.

Instead of the cable 23 a chain or any other suitable flexible carrier may be used with sprockets instead of the sheaves.

A locking device is provided for front wheels which consists of pieces of angle iron 29 attached to the deck at the sides of the rails 2. The vertical shelves of the angles have apertures 30 for sliding locking rods 31 which retain the front wheels in a fixed position thereby holding the automobile 1 in an operating position with the rear or driving wheels resting against the driving rollers 5.

The rollers may be prevented from rotation by means of locking rods 32 slidably fitted in bearings 33 in the walls of the housings 4. The outer end of the rod 32 is pivotally connected with a lever 34 mounted on a pivot 35 supported by a bracket 36. The upper end of the arm or lever 34 is provided with a handle.

The inner end of the locking rod 32, when pushed inside of the housing 4, fits in one of the holes 37 in the webs 38 of the drum 5. A similar locking rod with an arm 39 is provided for each of the idler drums 10.

The ends of the pontoon are provided with holes 40 for clevises 41. Links 42 are pivoted in these clevises with pivots 43. The outer ends of these links may be connected with clevises 44 mounted on the edge of a shore or landing pontoon 45, thereby forming a flexible connection between the hull 1 and the shore pontoon 45. The other end of the shore pontoon (not shown) is flexibly connected with a permanent structure on the shore leading to a roadway.

The operation of my pontoon is as follows:

The pontoon is flexibly connected with one end (front or rear) with the shore raft or pontoon 45. The automobile 1 is then driven from the shore over the landing pontoon on the rails 2 of the pontoon 1, until its rear wheels come on top of the rollers 5 being supported at the rear with idler rollers 10. All these rollers are prevented from rotation by the locking bars 32.

Upon release of the locking bars 32 and removal of pins 46, the pontoon becomes free to move on the water. It is then submerged to the line 47.

The motor is started by the driver who occupies his regular seat at the steering wheel. In this position he can control the speed of the motor and can also steer by turning the wheel 28. Upon arrival at the destination the pontoon is again attached to the shore raft by means of pivoted links 42 or similar flexible connections. It may be also attached with ropes tied around buttons 48.

Important advantages of my pontoon are that it can be used for transporting automobiles and trucks across rivers or bays, also it may be used as a means for travelling on the rivers, for instance, for fishing, camping, etc.

A number of such pontoons may be placed for service between the shores of a river where there is no bridge available, so that motorists may travel across using power of their own automobiles.

I claim as my invention:

In a pontoon for automobiles, the combination with a hull, of a substantially flat deck on said hull, rails on said deck extending from one end of said boat to the other, said rails being adapted to suit the wheels of an automobile, friction wheels in said hull adapted to support the wheels of said automobile, portions of said rails being removed to make room for said friction wheels, a shaft connecting said friction wheels, operating connections between said shaft and said screw propeller, housings for said wheels open on top and extending under the deck of said hull, and water tight bearings for said shaft in the walls of said housing.

Signed at Brooklyn, in the county of Kings and State of New York this 18th day of November A. D. 1927.

ALEXANDER L. DMITRIEFF.